Patented Feb. 5, 1935

1,989,775

UNITED STATES PATENT OFFICE 1,989,775

BITUMINOUS EMULSION AND ITS PRODUCTION

Preston R. Smith, Rahway, N. J., assignor to The Barber Asphalt Company, Philadelphia, Pa., a corporation of Pennsylvania No Drawing. Application June 3, 1931, Serial No. 541,941

15 Claims. (Cl. 134—1)

This invention relates to bituminous emulsions and their manufacture including emulsions of pitches, tars and tar-like substances, resins and other bituminous substances of artificial and natural origin such as asphalt and asphalt products. Such emulsions are used as bindings, adhesives, and coating compositions, as well as for impregnating and surfacing purposes.

It is the broad object of the present invention to produce improved bituminous emulsions specifically using sodium metasilicate in aqueous solution as the emulsifying agent. The emulsions so formed are quite stable and resist freezing and subsequent thawing without breaking. The emulsions are further readily formed and involve sodium metasilicate yielding strongly alkaline solutions which maintain a very high degree of alkalinity even when extremely dilute so that the emulsions may vary considerably in composition.

The emulsions are particularly valuable inasmuch as the sodium metasilicate acts as a stabilizing agent preventing the breaking of emulsions when mixed with dirty stone, hard water, or the like.

Prior to a description of the emulsions forming the subject matter of the present invention it may be pointed out that the ordinary sodium silicates composing water glass are not useful as emulsifying agents although under certain conditions they form valuable additions to already formed emulsions or emulsions which are formed by the use of auxiliary emulsifying agents. While ordinary sodium silicate has been suggested as an emulsifying agent, it is incapable of producing a satisfactory bituminous emulsion, since for effecting emulsification of the bitumen it must be used in such amount as to form a highly viscous solution resulting in the formation of a paste emulsion as compared to an emulsion having substantially low viscosity relative to the bitumen content, or the viscosity of the sodium silicate solution must be increased or apparently increased by the addition, for example, of a filler, which necessarily remains in the emulsion, increasing the viscosity thereof to the form of a paste and wholly disadvantageous for many uses for which bituminous emulsions are desirable. As a consequence ordinary sodium silicates have, as a practical matter, not been used alone for the formation of bituminous emulsions, but have rather been used merely in association with other emulsifying agents for cumulative effect or effects other than as an emulsifier. As compared with these heretofore generally wellknown sodium silicates, sodium metasilicate, $Na_2SiO_3.5H_2O$ in aqueous solution acts directly as an emulsifying agent producing the stabilized emulsions to which reference has already been made. Further, with the use of sodium metasilicate bituminous emulsions of high bitumen content and, at the same time, of high fluidity or relatively low viscosity may be produced and without the necessity for the use of any other emulsifying agent or of fillers.

The concentration of the aqueous sodium metasilicate solution used as emulsifying agent may vary to a large degree, for example, from 0.1% to about 1.8%, or within the narrower range 0.2%–1.6% of the crystalline salt. The hydrogen ion concentration of the weaker solution just mentioned has a pH value of approximately 11.6 while that of the stronger is approximately 12.5. It is to be noted that even though the percentage of sodium metasilicate in solution varies quite considerably, nevertheless, the hydrogen ion concentration varies but little.

The bituminous emulsion may be formed in numerous ways; for example, sodium metasilicate solution of a concentration within the range above mentioned may be mixed with asphalt using for the emulsification any of the mechanical mixers or agitators now in common use for preparing bituminous emulsions. The percentage of emulsifying agent and bituminous substance may vary considerably, the bitumen forming, for example, from 40% to 75% of the emulsion. In general, the proportions are determined both by the physical properties desired for the finished emulsion and by the choice of mechanical means used to produce the emulsion, less emulsifier being required with a highly effective mechanical device than with a less effective one.

While, in general, emulsions of oil-in-water type are desired, nevertheless, emulsions of the water-in-oil type may be readily produced using sodium metasilicate as an emulsifying agent, the concentration of the metasilicate agent in water in this case being above 1.8%.

Bituminous emulsions prepared in accordance with the invention are found to have the general properties of emulsions heretofore produced. Thus, the emulsions will have comparable stability to those produced with emulsifiers heretofore ordinarily used, desirable high fluidity with high bitumen content, etc.

It will be obvious that the emulsions may be admixed with other substances to form final products and that the emulsions need not be formed using sodium metasilicate alone as the emulsifying agent. That is, other emulsifying agents which are not incompatible with sodium metasilicate may be additionally used.

While the above description has referred specifically to sodium metasilicate it is possible to use potassium or other alkali metasilicate instead of the sodium metasilicate with substantially the same results. However, by reason of its cheapness the use of sodium metasilicate is preferred.

What I claim and desire to protect by Letters Patent is:

1. A bituminous emulsion including as constituents bitumen and an aqueous solution containing alkali metasilicate as an emulsifying agent.

2. A bituminous emulsion including as constituents bitumen and an aqueous solution containing alkali metasilicate as an emulsifying agent, the emulsion being of oil-in-water type.

3. A bituminous emulsion including as constituents bitumen and an aqueous solution containing alkali metasilicate to the extent of 0.2% to 1.6%.

4. A bituminous emulsion including as constituents bitumen and an aqueous solution containing alkali metasilicate as an emulsifying agent and having a pH value between 11.6 and 12.5.

5. A bituminous emulsion free from solid material other than bitumen, high in bitumen content and of low viscosity relative to the bitumen content, including as constituents bitumen and an aqueous solution containing alkali metasilicate as an emulsifying agent.

6. A bituminous emulsion free from solid material other than bitumen, high in bitumen content and of low viscosity relative to the bitumen content, including as constituents bitumen and an aqueous solution containing alkali metasilicate as the sole emulsifying agent.

7. A bituminous emulsion free from solid material other than bitumen within the range 40%–75% and of low viscosity relative to the bitumen content, incdluding as constituents bitumen and an aqueous solution containing alkali metasilicate as an emulsifying agent.

8. A bituminous emulsion free from solid material other than bitumen, high in bitumen content and of low viscosity relative to the bitumen content, including as constituents bitumen and an aqueous solution containing alkali metasilicate as an emulsifying agent, the emulsion being of the oil in water type.

9. The method of making a bituminous emulsion which includes intermixing bitumen in a fluid state with an aqueous solution containing alkali metasilicate as an emulsifying agent of low concentration, of high fluidity and free from suspended material.

10. The method of making a bituminous emulsion which includes intermixing bitumen in a fluid state with an aqueous solution containing alkali metasilicate in amount within about the range 0.1%–1.8%.

11. The method of making a bituminous emulsion including intermixing bitumen in a fluid state with an aqueous solution containing sodium metasilicate as an emulsifying agent of low concentration and high fluidity and having a pH value within about the range pH 11.6 to pH 12.0.

12. The method of making a bituminous emulsion which includes intermixing bitumen in a fluid state with an aqueous solution containing sodium metasilicate of a concentration within about the range 0.1%–1.8% and free from suspended material.

13. The method of making a bituminous emulsion which includes intermixing bitumen in a fluid state with an aqueous solution containing alkali metasilicate in amount about 1.6%.

14. The method of making a bituminous emulsion which includes intermixing bitumen in a fluid state with an aqueous solution containing sodium metasilicate in amount about 1.6%.

15. A bituminous emulsion including as constituents bitumen and an aqueous solution containing sodium metasilicate in amount of 0.2%–1.6%.

PRESTON R. SMITH.